(12) United States Patent
Kitazawa et al.

(10) Patent No.: US 7,546,968 B2
(45) Date of Patent: Jun. 16, 2009

(54) FIXTURE AND WEBBING TAKE-UP DEVICE

(75) Inventors: Yasuho Kitazawa, Aichi-ken (JP);
Hitoshi Takamatsu, Aichi-ken (JP);
Masaki Yasuda, Aichi-ken (JP);
Kazuhiko Aihara, Aichi-ken (JP);
Toshio Nakashima, Aichi-ken (JP);
Tomonori Nagata, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 411 days.

(21) Appl. No.: 11/337,693

(22) Filed: Jan. 24, 2006

(65) Prior Publication Data

US 2006/0169821 A1    Aug. 3, 2006

(30) Foreign Application Priority Data

Feb. 2, 2005    (JP)    ............................. 2005-026637

(51) Int. Cl.
*B65H 75/48*    (2006.01)

(52) U.S. Cl. .................................................. 242/374

(58) Field of Classification Search ................ 242/374, 242/379; 280/806, 807, 297, 475, 476.1, 280/477, 478, 480; 248/65, 230.2, 231.85, 248/73, 230.1, 230.8, 219.3, 227.4, 227.3, 248/68.1; 60/632; 285/24, 27; 403/234, 403/213, 335; 24/284, 459, 20 R, 462; 211/107, 211/182

See application file for complete search history.

(56) References Cited

U.S. PATENT DOCUMENTS

| | | | | |
|---|---|---|---|---|
| 566,544 A | * | 8/1896 | Smith | .......................... 248/68.1 |
| 900,663 A | * | 10/1908 | Callane | ....................... 403/388 |
| 1,123,107 A | * | 12/1914 | Darr | .............................. 52/684 |
| 4,568,109 A | * | 2/1986 | Prueter | ........................ 285/24 |
| 5,564,307 A | * | 10/1996 | Uryu | ................................ 74/2 |
| 5,810,305 A | * | 9/1998 | Heard et al. | ............. 248/218.4 |
| 6,000,655 A | | 12/1999 | Coppo | |

(Continued)

FOREIGN PATENT DOCUMENTS

CN    2290863 Y    9/1998

(Continued)

OTHER PUBLICATIONS

Enyu Zhu, Chinese Office Action, dated Jun. 1, 2007.

*Primary Examiner*—Peter M Cuomo
*Assistant Examiner*—Juan J Campos
(74) *Attorney, Agent, or Firm*—Roberts Mlotkowski Safran & Cole, P.C.; Thomas W. Cole

(57) ABSTRACT

A fixture is disclosed which can reliably attach an attachment member, such as a cylinder, to an attachment site, such as a frame. The fixture includes a fixing portion, which faces the attachment site at the side of the attachment site and is fixed to the attachment site, and a contact portion, which is disposed at the side opposite from the attachment site, with the attachment member therebetween. The contact portion is integrally coupled to the fixing portion, point-contacts or line-contacts the attachment member, and is configured to push the attachment member to the attachment site in a state where the fixing portion is fixed to the attachment site. A webbing take-up device including this fixture is also disclosed.

6 Claims, 3 Drawing Sheets

U.S. PATENT DOCUMENTS

| | | | | |
|---|---|---|---|---|
| 6,010,099 A | * | 1/2000 | Wertz et al. | 248/55 |
| 6,152,391 A | * | 11/2000 | Nagata et al. | 242/374 |
| 6,343,758 B1 | * | 2/2002 | Abe et al. | 242/374 |
| 6,367,211 B1 | * | 4/2002 | Weener et al. | 52/220.1 |
| 6,513,747 B1 | | 2/2003 | Lee et al. | |
| 6,527,233 B2 | * | 3/2003 | Maurice | 248/74.4 |
| 6,575,498 B2 | * | 6/2003 | Nagata et al. | 280/806 |
| 6,672,546 B2 | * | 1/2004 | Calleja | 248/58 |
| 6,698,677 B1 | * | 3/2004 | Happ et al. | 242/374 |
| 2003/0029977 A1 | * | 2/2003 | Kim | 248/230.8 |
| 2005/0218270 A1 | * | 10/2005 | Doverspike | 248/65 |

FOREIGN PATENT DOCUMENTS

| | | |
|---|---|---|
| CN | 2915604 Y | 6/2007 |
| DE | 4310344 | 10/1994 |
| JP | 2003-267186 | 9/2003 |

* cited by examiner

FIXTURE AND WEBBING TAKE-UP DEVICE

CROSS-REFERENCE TO RELATED APPLICATION

This application claims priority under 35 USC 119 from Japanese Patent Application No. 2005-26637, the disclosure of which is incorporated by reference herein.

BACKGROUND OF THE INVENTION

1. Field of the Invention

The present invention relates to a webbing take-up device, and more particularly to a fixture for fixing an attachment member to an attachment site and a webbing take-up device that takes up and accommodates a webbing belt that restrains the body of a vehicular passenger.

2. Description of the Related Art

A seat belt device that restrains the body of a passenger seated in the seat of a vehicle with a long band-like webbing belt includes a webbing take-up device fixed to the vehicle body at the side of the seat. The webbing take-up device includes a spool whose axial direction is, for example, along the substantial front-rear direction of the vehicle. The longitudinal-direction base end of the webbing belt is attached to the spool.

The spool can take up the webbing belt in layers around its outer peripheral portion, and is configured to take up and accommodate the webbing belt around its outer peripheral portion when the seat belt device is not in use.

A pretensioner that detects acceleration (deceleration) when the vehicle suddenly decelerates and forcibly causes the spool to rotate in the take-up direction is disposed in the webbing take-up device (for an example thereof, see Japanese Patent Application Publication (JP-A) No. 2003-267186).

The pretensioner includes a cylinder. A gas generator that is activated and immediately generates a large amount of gas when the vehicle suddenly decelerates is coupled to the cylinder. The internal pressure of the cylinder rises due to the pressure of the gas supplied from the gas generator.

A piston is slidably housed inside the cylinder. When the piston slides in accompaniment with the rise in the internal pressure of the cylinder, a lock bar disposed on the leading end of the piston causes a pinion disposed coaxially with the spool to rotate in the take-up direction.

The rotation of the pinion in the take-up direction is transmitted to the spool. Thus, when the spool rotates in the take-up direction, the spool takes up the webbing belt, eliminates the slight slack in the webbing belt placed around the body of the passenger, and restrains the body of the passenger with a restraining force that is stronger than before.

There have been many instances up to now where the cylinder of the pretensioner has been formed by die-casting. However, taking note of the fact that the cylinder has a cylindrical shape, the cost of the cylinder can be further reduced by forming the cylinder by press-molding an existing pipe-shaped member such as a stainless-steel pipe.

However, although a fixing portion for screwing the cylinder into a leg plate of the frame of the webbing take-up device can be formed in advance when the cylinder is formed by die-casting, there is no such fixing portion in existing pipe-shaped members.

Thus, it has been considered to put, at the outer peripheral portion of the cylinder, a fixture including a concave curved surface such that the outer peripheral portion of the cylinder fits therein and such that the side of the outer peripheral surface of the cylinder opposite from the side facing the frame substantially uniformly contacts the fixture.

However, it has been impossible to accurately cause the inner peripheral portion of the curved surface of the fixture to contact a preset range of the outer peripheral portion of the cylinder due to dimensional error of the outer peripheral shape of existing pipe-shaped members, deformation that arises due to press-molding when molding a pipe-shaped member into a cylinder, and dimensional error of the fixture itself, and it has been difficult to appropriately attach the cylinder to the frame.

SUMMARY OF THE INVENTION

In view of these circumstances, the present invention realizes a fixture and a webbing take-up device where a member that is to be retained, such as a cylinder, can be appropriately attached to an attachment site such as a frame.

A first aspect of the invention provides a fixture for fixing an attachment member to a predetermined attachment site at the side of the attachment site, the fixture comprising: a fixing portion that faces the attachment site at the side of the attachment member and is fixed to the attachment site; and a contact portion that is disposed at the side opposite from the attachment site, with the attachment member therebetween, is integrally coupled to the fixing portion, point-contacts or line-contacts the attachment member, and pushes the attachment member to the attachment site in a state where the fixing portion is fixed to the attachment site.

A second aspect of the invention provides a fixture for fixing a columnar or cylindrical attachment member to a predetermined attachment site at the side of the attachment site, the fixture comprising: a pair of fixing portions that are fixed to the attachment site and face the attachment site at both sides of the attachment member along a direction intersecting a longitudinal direction of the attachment member; and a contact portion that is disposed at the side opposite to the attachment site, with the attachment member therebetween, is integrally coupled to the pair of fixing portions, point-contacts the attachment member, or line-contacts the attachment member along the longitudinal direction of the attachment member, and pushes the attachment member to the attachment site in a state where the fixing portions are fixed to the attachment site.

A third aspect of the invention provides a webbing take-up device comprising: a frame that directly or indirectly rotatably axially supports a spool to which a base end of a long band-like webbing belt is attached; a pretensioner that accommodates a piston inside a cylinder that is formed in cylindrical shape where one end is open and is disposed at the side of the frame, with the pretensioner pushing the piston toward one end of the cylinder to cause the spool to rotate in a direction in which the spool takes up the webbing belt; and a fixture comprising a fixing portion fixed to the frame, and a contact portion that point-contacts, or line-contacts along the axial direction of the cylinder, the outer peripheral portion of the cylinder, and retains the frame with the contact portion pushing the cylinder against the frame in a state where the fixing portion is fixed to the frame.

Other aspects, features and advantages of the present invention will become apparent from the following description taken in conjunction with the accompanying drawings.

BRIEF DESCRIPTION OF THE DRAWINGS

A preferred embodiment of the present invention will be described in detail based on the following figures, in which.

DETAILED DESCRIPTION OF THE INVENTION

Figure 2:
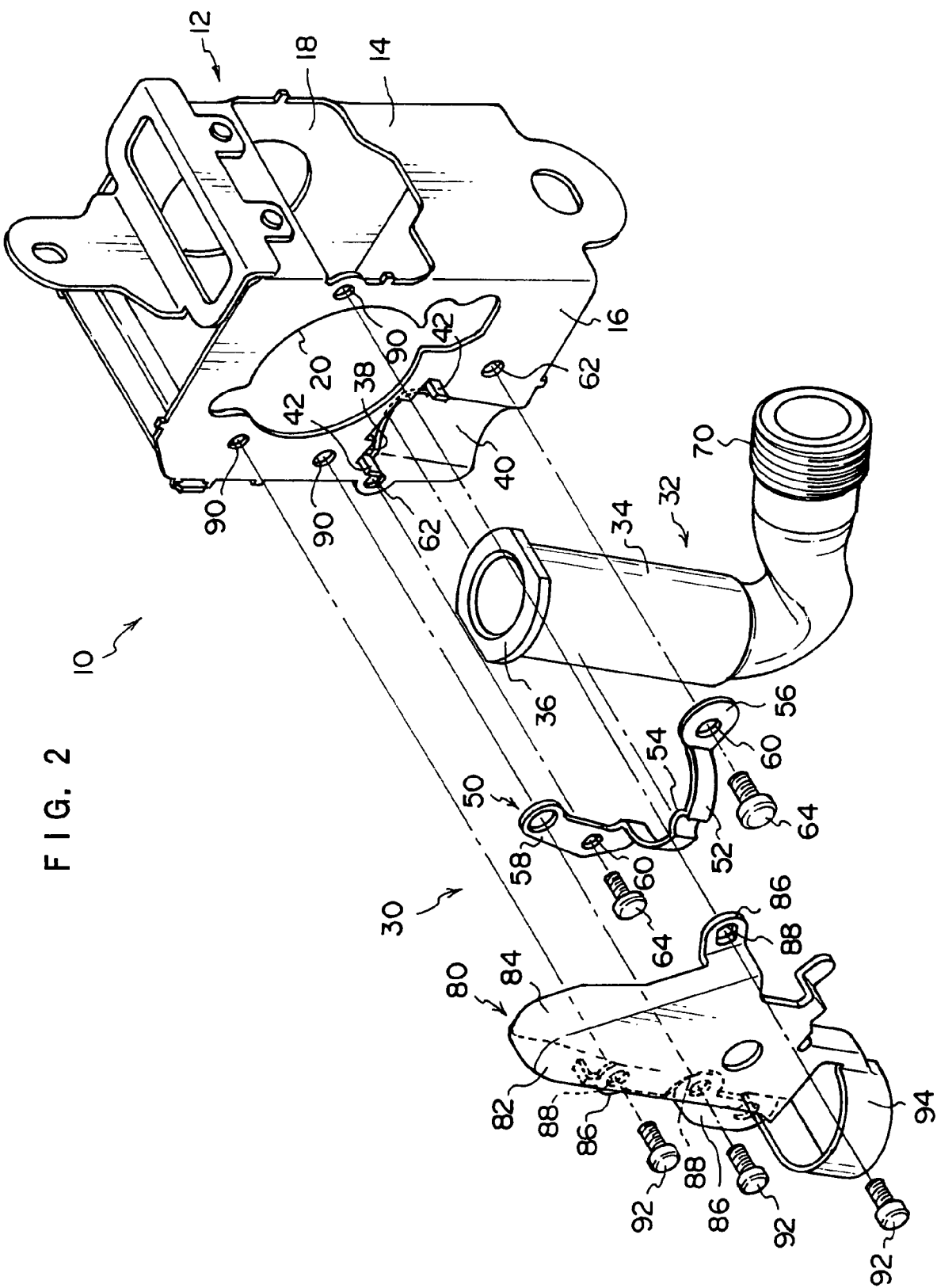
FIG. 2 is an exploded perspective view showing relevant portions of a webbing take-up device to which the fixture according to the embodiment of the invention is applied.
Figure 3:
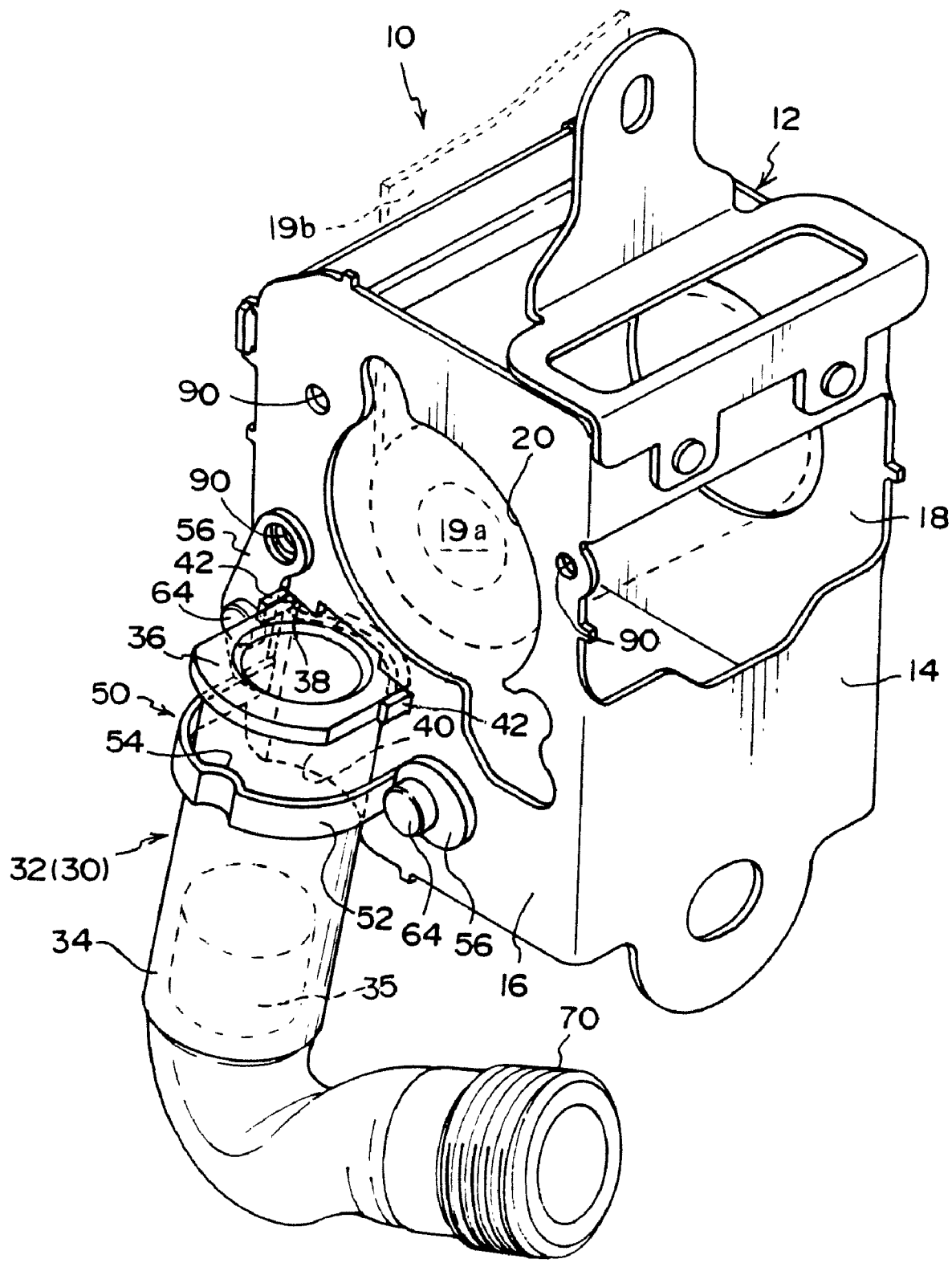
FIG. 3 is a perspective view showing an assembled state of the webbing take-up device to which the fixture according to the embodiment of the invention is applied.

FIG. 2 is an exploded perspective view showing the configuration of relevant portions of a webbing take-up device 10 to which a fixture 50 according to an embodiment of the invention is applied. FIG. 3 is a perspective view showing an assembled state of the relevant portions of the webbing take-up device 10.

As shown in these drawings, the webbing take-up device 10 includes a frame 12. The frame 12 includes a plate-like rear plate 14 whose thickness direction is, for example, along the substantial left-right direction of a vehicle disposed with the webbing take-up device 10. The rear plate 14 is fixed to the vehicle body with a bolt or the like in the vicinity of the lower end portion of a center pillar, for example, whereby the webbing take-up device 10 is attached to the vehicle body.

Leg plates 16 and 18 are formed on one width-direction end of the rear plate 14 along substantially the vehicle front-rear direction in a state where the webbing take-up device 10 is attached to the vehicle, such that the leg plates 16 and 18 bend inward in the vehicle width direction (into a cabin in the substantial vehicle left-right direction). A spool 19a (shown in phantom in FIG. 3), whose axial direction is in the direction in which the leg plate 16 and the leg plate 18 face each other, is disposed between the leg plate 16 and the leg plate 18.

The base end portion of a long band-like webbing belt 19b (also shown in phantom FIG. 3) is attached to the spool 19a. The spool 19a is rotated in a take-up direction, which is one direction around its axis, by the biasing force of biasing means such as a coil spring, whereby the spool 19a takes up and accommodates the webbing belt 19b from its base end.

A hole portion 20 that penetrates the thickness direction of the leg plate 16 is formed in the leg plate 16. One axial-direction end of the spool 19a, or one end of a torsion shaft disposed coaxially and integrally with the spool 19a, is passed through the hole portion 20 such that it protrudes outward of the frame 12.

A pretensioner 30 is disposed on the side of the leg plate 16 opposite from the side facing the leg plate 18 (i.e., the outer side of the leg plate 16 along the direction in which the leg plates 16 and 18 face each other). The pretensioner 30 includes a pretensioner body 32.

The pretensioner body 32 is formed by press-working a pipe-shaped member molded in a circular cylindrical shape using a metal such as stainless steel. The pretensioner body 32 includes a cylinder 34 serving as an attachment member. The cylinder 34 contains a piston 35 (shown in phantom in FIG. 3)and has a longitudinal direction along a direction that is slanted with respect to the vertical direction of the frame 12, with respect to an axial peripheral direction where the axial direction is the direction in which the leg plates 16 and 18 face each other.

Figure 1:
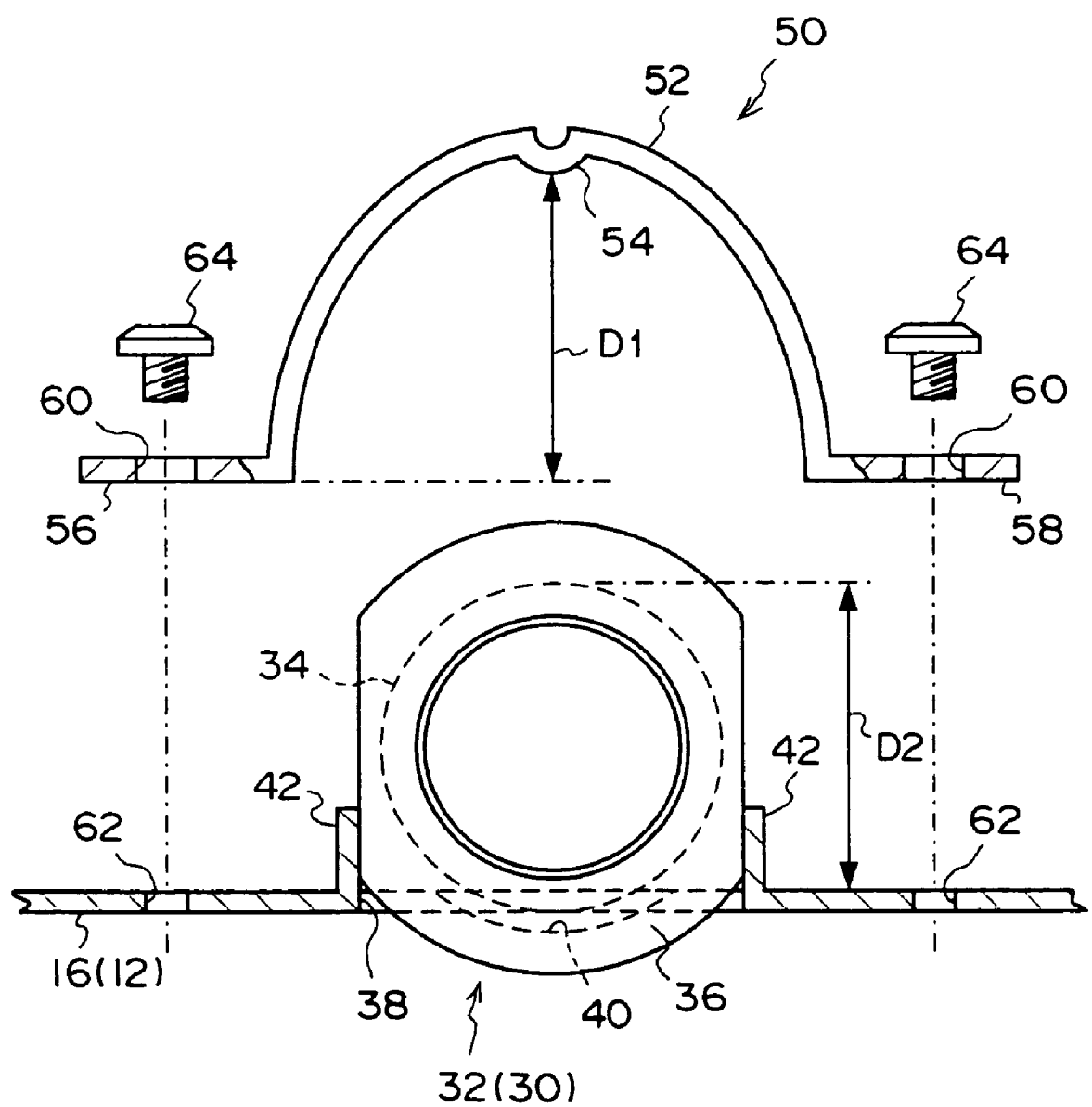
FIG. 1 is a cross-sectional view showing relevant portions of a fixture according to the embodiment of the invention.

A flange portion 36 that extends outward of the cylinder 34 along the direction orthogonal to the axial direction (longitudinal direction) of the cylinder 34 is disposed on the upper end of the cylinder 34. As shown in FIG. 1, in the present embodiment, when the flange portion 36 is seen along the axial direction (longitudinal direction) of the cylinder 34, the flange portion 36 is generally formed in a substantially oval shape, with the major axis direction in the direction in which the leg plates 16 and 18 face each other.

A slit hole 38 is formed in the leg plate 16 in correspondence to the flange portion 36. The open dimension in the short direction of the slit hole 38 is slightly larger than the thickness dimension of the flange portion 36, such that one end portion in the major axis direction of the flange portion 36 fits into the slit hole 38.

A concave portion 40 is formed in the leg plate 16 at the underside of the slit hole 38. The concave portion 40 curves such that it opens to the outer side of the leg plate 16 and is formed continuously with the lower end portion of the leg plate 16.

The radius of curvature of the concave portion 40 is larger than the outer diameter dimension of the cylinder 34. When the flange portion 36 is fitted into the slit hole 38, the outer peripheral surface of the cylinder 34 contacts the inner surface of the concave portion 40. Moreover, a pair of protrusions 42 is formed on the leg plate 16 at the outer sides of both longitudinal-direction end portions of the slit hole 38.

The protrusions 42 are formed in square bar-like shapes and protrude outward of the leg plate 16. The distance between the protrusions 42 is slightly larger than the minor axis dimension of the flange portion 36. When the flange portion 36 is fitted into the slit hole 38, both minor axis-direction ends of the flange portion 36 face both protrusions 42 in the immediate vicinity of both protrusions 42.

A fixture 50 is disposed in the webbing take-up device 10. As shown in FIG. 1, the fixture 50 includes a fixture body 52. The fixture body 52 is formed in a curved concave shape that opens toward the leg plate 16. The radius of curvature of the inner surface of the fixture body 52 is set to be equal to or greater than the outer diameter dimension of the cylinder 34.

A contact portion 54 is formed in the bottom portion of the fixture body 52 curved in this manner-or more specifically in the substantial center of the fixture body 52 between one open end and the other open end.

The contact portion 54 is formed by bending or curving the bottom portion of the fixture body 52 in the open direction of the fixture body 52. At the portion where the contact portion 54 is formed, the fixture body 52 has a concave shape that opens toward the side opposite from the side facing the leg plate 16. Because the contact portion 54 bends or curves in this manner such that it protrudes in the open direction of the fixture body 52, the contact portion 54 point-contacts the outer peripheral portion of the cylinder 34, or line-contacts the outer peripheral portion of the cylinder 34 along the axial direction of the cylinder 34, when the cylinder 34 enters the inside of the fixture body 52.

The "point contact" or "line contact" referred to here may mean that, with respect to the area of the outer peripheral portion of the cylinder 34, there is a breadth (area) in the portion where the contact portion 54 contacts the outer peripheral surface of the cylinder 34 as long as the contacting portion of the contact portion 54 is in a range that can be regarded as a "point" or a "line" (i.e., the "point contact" or "line contact" referred to here is not point contact or line contact in a mathematically strict sense).

Also, a depth dimension D1 of the fixture body 52 from the leading end of the contact portion 54 at the inner side of the fixture body 52 to both open ends of the fixture body 52 along the open direction of the fixture body 52 is set to be slightly smaller than a distance D2 from the outer surface of the leg plate 16 to the opposite side of the outer peripheral portion of the cylinder 34 from the side facing the leg plate 16 when the outer peripheral surface of the cylinder 34 contacts the inner surface of the concave portion 40.

A fixing portion 56 extends from one side of the open end of the fixture body 52, and a fixing portion 58 extends from the other side of the open end of the fixture body 52. Each of the fixing portions 56 and 58 is formed in a flat plate-like shape parallel to the leg plate 16.

A through hole 60 is formed in each of the fixing portions 56 and 58. Screw holes 62 are formed in the leg plate 16 in correspondence to the through holes 60. Fixing screws 64 are passed through the through holes 60 and screwed into the screw holes 62 from the side of the fixing portions 56 and 58 opposite from the side facing the leg plate 16. Thus, the fixture 50 is fixed to the leg plate 16.

As shown in FIG. 2, an attachment portion 70 that configures the pretensioner body 32 together with the cylinder 34 is formed on the lower end portion of the cylinder 34. The attachment portion 70 is formed together with the cylinder 34 by press-working a pipe-shaped member. For this reason, the attachment portion 70 is formed overall in a circular cylindrical shape, and its axial direction (in the open direction) faces a direction intersecting the axial direction of the cylinder 34.

Male threads are formed on the outer peripheral portion of the attachment portion 70. An unillustrated gas generator is screwed onto the male threads and attached to the attachment portion 70. A gas generating agent is stored inside the gas generator, and when the gas generating agent combusts, gas is immediately generated and discharged to the outside of the gas generator.

The gas discharged from the gas generator is supplied to the inner bottom portion of the cylinder 34 via the attachment portion 70. Thus, the internal pressure of the cylinder 34 abruptly rises. It will be noted that the configuration of the gas generator is not limited to a configuration where gas is generated as a result of combusting a gas generating agent such as described above, and may also be a configuration where gas is generated by the chemical reaction of plural chemical agents or a configuration where compressed gas stored in a gas tank is discharged.

As shown in FIG. 2, a cover 80 that configures the pretensioner 30 together with the pretensioner body 32 is disposed on the leg plate 16. The cover 80 includes a side plate 82. The side plate 82 is formed in a plate-like shape parallel to the leg plate 16 and has a triangular shape with one edge along the axial direction of the cylinder 34 when seen in side view (i.e., when the side plate 82 is seen along its thickness direction).

The cover 80 also includes a peripheral wall 84 that is disposed on one outer peripheral portion of the side plate 82 and extends toward the leg plate 16. The side plate 82 has an overall concave shape that generally opens toward the leg plate 16. Fixing pieces 86 are formed on parts of the peripheral wall 84.

The fixing pieces 86 extend like tongue pieces toward the outer side of the cover 80 parallel to the leg plate 16. A through hole 88 is formed in each of the fixing pieces 86. Screw holes 90 are formed in the leg plate 16 in correspondence to the through holes 88. Fixing screws 92 are passed through the through holes 88 and screwed into the screw holes 90 from the side of the fixing pieces 86 opposite from the side facing the leg plate 16. Thus, the cover 80 is fixed to the leg plate 16.

A holding portion 94 is formed on the lower end portion of the cover 80. The holding portion 94 is formed in a curved concave shape such that it opens toward the leg plate 16, and the radius of curvature of the inner peripheral portion of the holding portion 94 is slightly larger than the radius of curvature of the outer peripheral portion of the fixture body 52.

When the fixture 50 and the cover 80 are fixed to the leg plate 16, the holding portion 94 faces the fixture body 52 at the side of the fixture body 52 along the thickness direction of the side plate 82.

Next, the action and effects of the present embodiment will be described by describing the process of assembling the pretensioner 30 of the webbing take-up device 10.

In the process of assembling the pretensioner 30, first, the outer peripheral portion of the cylinder 34 is fitted into the concave portion 40 formed in the leg plate 16, and the flange portion 36 is fitted into the slit hole 38. In this state, the cylinder 34 is particularly fixed.

As described above, the distance between the protrusions 42 formed at both longitudinal-direction end portions of the slit hole 38 is slightly larger than the minor axis dimension of the flange portion 36. Consequently, the displacement of the cylinder 34 along the direction in which the protrusions 42 face each other is regulated because the flange portion 36 is obstructed by the protrusions 42.

Also, as described above, the flange portion 36 is fitted into the slit hole 38, whereby the inner peripheral portion of the slit hole 38 obstructs the flange portion 36 along the thickness direction of the flange portion 36, that is, the direction of opening of the cylinder 34. Consequently, the displacement of the cylinder 34 along the direction of opening of the cylinder 34 is regulated. Thus, in this state, the cylinder 34 is positioned in a predetermined position with respect to the leg plate 16 even if the cylinder 34 is not fixed.

Next, the fixture 50 is attached to the leg plate 16. As shown in FIGS. 1 to 3, the fixing portion 56 is moved toward the leg plate 16 in a state where the through hole 60 in the fixing portion 56 and the screw hole 62 in the leg plate 16 are facing each other, and the cylinder 34 enters the inside of the fixture body 52.

Even so, as described above, because the dimension D1 in FIG. 1 is slightly smaller than the dimension D2, the fixing portion 56 is slightly separated from the leg plate 16 when the contact portion 54 contacts the outer peripheral portion of the cylinder 34. In this state, the fixing screw 64 is passed through the through hole 60 and screwed into the screw hole 62.

When the fixing screw 64 is screwed into the screw hole 62, the top portion of the fixing screw 64 approaches and contacts the fixing portion 56. When the fixing screw 64 is further screwed into the screw hole 62 from this state, the fixture 50 becomes slightly elastically deformed and the fixing portion 56 contacts the leg plate 16.

In this state, the contact portion 54 is pressed against the outer peripheral portion of the cylinder 34 with a pressure corresponding to the elastic deformation of the fixture 50, and the contact portion 54 pushes the cylinder 34 against the inner peripheral portion of the concave portion 40 (i.e., the leg plate 16). Thus, the cylinder 34 is sandwiched by the leg plate 16 and the contact portion 54.

Next, the fixing screws 92 are passed through the through holes 88 and screwed into the screw holes 90 in a state where the through holes 88 formed in the fixing pieces 86 of the cover 80 and the screw holes 90 formed in the leg plate 16 are facing each other. Thus, the cover 80 is attached to the leg plate 16, and the holding portion 94 faces the fixture body 52 at the outer side of the fixture body 52.

As described above, in the webbing take-up device 10, the cylinder 34, the flange portion 36 and the attachment portion 70 are formed by press-working a pipe-like member formed by a metal such as stainless steel. For this reason, there is the potential for error to arise in the outer diameter dimension of the cylinder 34 due to forming error at the time of the press-working.

However, the radius of curvature of the inner peripheral portion of the fixture body 52 is sufficiently larger than the radius dimension of the outer peripheral portion of the cylinder 34. For this reason, even if error arises in the outer diameter dimension of the cylinder 34 as described above, the cylinder 34 can be fitted into the fixture body 52 in the state where the cylinder 34 is fitted into the concave portion 40.

Moreover, the fixture 50, in whose fixture body 52 the cylinder 34 has been fitted, sandwiches the cylinder 34 between the contact portion 54 and the leg plate 16 in a state where the contact portion 54 point-contacts or line-contacts the outer peripheral portion of the cylinder 34. For this reason, even if error arises in the outer diameter dimension of the cylinder 34 as described above, the cylinder 34 can be reliably fixed at the side of the leg plate 16.

In this manner, in the webbing take-up device 10, the cylinder 34 can be reliably fixed by the fixture 50 to, and at the side of, the leg plate 16. Thus, when the pretensioner 30 is activated, the cylinder 34 can be effectively prevented from being inadvertently displaced and the pretensioner 30 can be appropriately activated.

In the present embodiment, a configuration was described where the fixture 50 was used in order to fix the cylinder 34 of the pretensioner 30, but from the standpoint of the invention described in the following claims, the fixture according to the invention including the fixture 50 is not limited to being for fixing the cylinder 34, and can similarly be used to fix a member of the webbing take-up device 10 other than the cylinder 34, or to fix various kinds of members other than those of the webbing take-up device 10.

What is claimed is:

1. A fixture for fixing a columnar or cylindrical attachment member to a predetermined attachment site, at the side of the attachment site, the fixture comprising:
    a pair of fixing portions that are fixed to the attachment site and face the attachment site at both sides of the attachment member along a direction intersecting a longitudinal direction of the attachment member; and
    a contact portion that is disposed at the side opposite to the attachment site, with the attachment member therebetween, is integrally coupled to the pair of fixing portions, point-contacts the attachment member, or line-contacts the attachment member along the longitudinal direction of the attachment member, and pushes the attachment member to the attachment site in a state where the fixing portions are fixed to the attachment site,
    further including a fixture body that is formed in a concave shape opening toward the attachment site, and in which the fixing portions are formed at both ends of the open side, and on whose inner peripheral portion the contact portion is formed,
    wherein the dimension from the surface of the fixture body facing the attachment site to where the contact portion contacts the attachment member, along the direction of opening of the fixture body, is set to be less than an outer dimension of the attachment member along the direction of opening, and
    wherein the contact portion is formed so as to protrude toward the open side from a substantially center portion of the inner peripheral portion of the concave shape portion of the fixture body.

2. A webbing take-up device including the fixture of claim 1.

3. The fixture of claim 1, wherein the attachment member comprises a circular columnar or circular cylindrical member formed by processing a pre-formed member.

4. The webbing take-up device of claim 2, wherein the attachment member comprises a circular columnar or circular cylindrical member formed by processing a pre-formed member.

5. A webbing take-up device comprising:
    a frame that directly or indirectly rotatably axially supports a spool to which a base end of a long band-like webbing belt is attached;
    a pretensioner that accommodates a piston inside a cylinder that is formed in cylindrical shape where one end is open and is disposed at the side of the frame, with the pretensioner pushing the piston toward one end of the cylinder to cause the spool to rotate in a direction in which the spool takes up the webbing belt; and
    a fixture comprising a fixture body fixed to the frame and a contact portion that point-contacts, or line-contacts along the axial direction of the cylinder, the outer peripheral portion of the cylinder, and retains the frame with the contact portion pushing the cylinder against the frame in a state where the fixture body is fixed to the frame,
    wherein the fixture body is formed in a concave shape that opens toward the cylinder, and in which fixing portions are formed at both ends thereof, and on whose inner peripheral portion the contact portion is formed,
    wherein the dimension from the contact portion of the inner surface of the fixture body facing the cylinder to where the fixing portions contact the frame is set to be less than an outer dimension of the cylinder such that the fixture body resiliently retains the cylinder against the frame, and
    wherein the contact portion is formed so as to protrude toward the open side from a substantially center portion of the inner peripheral portion of the concave shape portion of the fixture body.

6. The webbing take-up device of claim 5, wherein the cylinder comprises a cylinder formed by processing a pre-formed pipe-shaped member.

* * * * *